(12) United States Patent
Acker

(10) Patent No.: US 8,091,418 B2
(45) Date of Patent: Jan. 10, 2012

(54) TRANSMISSION SYSTEM FOR TIRE STATE QUANTITIES

(75) Inventor: Heinrich Acker, Schwalbach (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 866 days.

(21) Appl. No.: 11/793,096

(22) PCT Filed: Dec. 9, 2005

(86) PCT No.: PCT/EP2005/056650
§ 371 (c)(1),
(2), (4) Date: Jun. 27, 2008

(87) PCT Pub. No.: WO2006/063970
PCT Pub. Date: Jun. 22, 2006

(65) Prior Publication Data
US 2009/0013773 A1    Jan. 15, 2009

(30) Foreign Application Priority Data

Dec. 15, 2004  (DE) .......................... 10 2004 060 751
Dec. 9, 2005   (DE) .......................... 10 2005 059 374

(51) Int. Cl.
*B60C 23/02* (2006.01)

(52) U.S. Cl. ........................................ 73/146.2; 73/146

(58) Field of Classification Search .................. None
See application file for complete search history.

(56) References Cited

U.S. PATENT DOCUMENTS

| 4,675,638 | A | 6/1987 | Szabo |
| 5,190,247 | A | 3/1993 | Le Chatelier |
| 7,089,791 | B2 * | 8/2006 | Pradier ........................... 73/494 |
| 7,209,032 | B2 * | 4/2007 | Fennel et al. ................. 340/445 |
| 7,394,242 | B2 * | 7/2008 | Pradier et al. ................. 324/174 |
| 7,446,660 | B2 * | 11/2008 | Posamentier .............. 340/572.1 |
| 7,489,996 | B2 * | 2/2009 | Gowan et al. ................... 701/71 |
| 7,667,584 | B2 * | 2/2010 | Tsuchida ..................... 340/445 |

FOREIGN PATENT DOCUMENTS

WO   WO 03031210 A1 *  4/2003

* cited by examiner

*Primary Examiner* — Lisa Caputo
*Assistant Examiner* — Jermaine Jenkins

(57) ABSTRACT

A transmission device for motor vehicles for transmitting signals about tire condition variables from a wheel to an electronic evaluating or control unit arranged in the area of the vehicle body, wherein the tire condition variables can be detected especially by one or a plurality of sensor subassemblies (14) which are arranged in a wheel rotatably mounted at the body above the wheel hub (3), characterized in that a coupling device is integrated into the wheel hub, which is composed of a rotor (6a) and a non-rotating stator (6b) to generate a field coupling, and whose one or more field coupling elements (20, 22, 27a, 27b, 29a, 29b, 30a, 30b, 34a, 34b, 39a, 39b, 42, 43) are opposite each other, separated by a narrow air slot (24), and an energy and/or signal coupling takes place by way of electric fields and/or magnetic fields, and/or electromagnetic fields, is meant to determine the rotational speed of the wheel. To this end, the rotor (6a) and/or the stator (6b) is subdivided in a circumferential direction into two or more sectors, with the sectors having a differing permeability for a rotational-speed-responsive field coupling of rotor (6a) and stator (6b).

41 Claims, 9 Drawing Sheets

TRANSMISSION SYSTEM FOR TIRE STATE QUANTITIES

This application is the U.S. national phase of international application PCT/EP05/56650 filed Dec. 9, 2005, which designated the U.S. and which claims the benefit of priority of German Patent Application Number 10 2005 059 374.7 filed Dec. 9, 2004 and german Patent Application Number 10 2004 060 751.6 filed Dec. 15, 2004. The contents of each of the aforementioned documents are incorporated herein in their entirety.

BACKGROUND OF THE INVENTION

Brake systems of modern motor vehicles generally include a number of safety functions or auxiliary devices such as an anti-lock system (ABS) or an electronic stability program (ESP), which are meant to contribute to enhancing the safety of the motor vehicle especially during braking. Typically, an electronic control unit (ECU) is employed for the control of these systems. Most various parameters such as tire condition variables in particular are required as input signals for this control unit. Predominantly, the tire condition variables shall be used for the automated increase of vehicle safety by electronically controlled brake reactions. In addition, there is the possibility of indicating to the driver interesting information such as the measured tire pressure, by way of showing it on separate display units.

Among others, physical conditions are determined as tire condition variables such as the inside air pressure, air temperature, temperature of the tire rubber, rubber deformations, or noise spectra of the tire, but also characteristic values or characteristics of the tire, from which age, structural shape or the type of the tire, such as summer or winter tire, can be taken. Further, e.g. wheel parameters are measured that are required for driving dynamics control of the motor vehicle such as lateral tire force, wheel torque, or the tire contact force.

Tire condition variables are usually determined or measured on one wheel, on several or all wheels of the motor vehicle. An appropriate transmission system is required in order to transmit the signals measured by the rotating wheel or tire to the motor vehicle. In prior art transmission systems, wherein tire condition variables are transmitted wirelessly to a receiver in the motor vehicle by way of an active sensor in the wheel, it is disadvantageous that, given usual transmitting field intensities, the received signal can be received in every receiving device, unfavorably even in a neighboring vehicle, because transmitters generally use a like carrier frequency range. When developing a transmission device for tire condition variables, there is the problem in the application of high-frequency methods that one objective is to achieve a sufficient radius of the service area, while on the other hand another objective is to appropriately suppress common channel interferences or to avoid other undesirable couplings between several transmitters and receiving devices in addition.

To avoid these problems, a so-called wheel-hub coupler is known in the art, which allows transmitting data between the rotating wheel and the motor vehicle in a wireless fashion. The function principle herein is an inductive coupling of wheel and motor vehicle. To this end, a coupling device or a wheel-hub coupler is arranged in one or more wheel hubs of the motor vehicle, and the coupling device for generating a field coupling is composed of a rotor and a non-rotating stator. The one or more field coupling elements are opposed to each other, separated by a narrow air slot, and coupling takes place through electric fields and/or magnetic fields, and/or electromagnetic fields. The advantage of this wheel-hub coupler renders it possible to transmit not only signals of measuring systems, but also energy into the interior of a tire for the supply of a measuring system. Further, a dynamo can be integrated into the wheel-hub coupler to supply the measuring systems arranged in the tire interior.

The coupling device made up of stator and rotor substantially includes a number of stator and rotor windings for an inductive coupling, and these windings can be designed as flat coils and cylindrical coils, while the windings of stator and rotor are spaced from each other by a narrow air slot. Depending on the desired transferable power and/or the desired requirements with regard to a shielding, stator and rotor members in the winding area can be designed as ferrite or sheet iron half shells or shielding half shells. These are mounted into the windings in such a fashion that they embrace like shells the windings of rotor and stator jointly in the type of a mantle core with the air slot.

A shortcoming of the wheel-hub coupler described above is that a wheel rotational speed sensor is required at each wheel hub in addition with the wheel-hub coupler for use in a motor vehicle, which is equipped with both a system of measurement with wheel-hub coupler and an ABS brake system. It is problematic that wheel-hub coupler and wheel rotational speed sensor, depending on their construction, compete with each other for the same mounting space. Besides, the magnetic field of the wheel-hub coupler can cause interferences at the rotational speed sensor, because the mode of operation thereof can also found on measuring magnetic fields.

Another disadvantage in the use of wheel rotational speed sensors, which usually found on Hall probes or magnetoresistive sensors, wherein the signal-generating structure such as an encoder, grid or toothed wheel is scanned in dots, is the danger of a so-called pole pitch error appearing due to process tolerances of the signal-generating structure. The pole pitch error implies that the sectors cover different angles so that with a constant rotational speed, variation of the instantaneous rotational speed may be faked, what can cause malfunctions in control systems such as ABS.

In view of the above, an object of the invention is to provide a device for transmitting signals about tire condition variables from a wheel to an electronic controlling or evaluating device arranged in the area of the vehicle body, wherein the tire condition variables can be sensed especially by one or more sensor subassemblies, which are arranged in a wheel rotatably mounted above a wheel hub on the chassis, and the purpose of the transmission device is to determine the rotational speed of the wheel.

SUMMARY OF THE INVENTION

This object is achieved by the invention because a transmission device for motor vehicles for transmitting signals about tire condition variables from a wheel to an electronic controlling or evaluating device arranged in the area of the vehicle body, wherein the tire condition variables can be sensed especially by one or more sensor subassemblies, which are arranged in a wheel rotatably mounted above a wheel hub on the chassis is characterized in that a coupling device is integrated into the wheel hub, which is composed of a rotor and a non-rotating stator to generate a field coupling, and whose one or more field coupling elements are opposite each other, separated by a narrow air slot, and an energy and/or signal coupling takes place by way of electric fields and/or magnetic fields, and/or electromagnetic fields, and the rotor and/or the stator is subdivided in a circumferential direction into two or more sectors, with the sectors including a differing magnetic coupling for a rotational-speed-responsive field coupling of rotor and stator.

The invention is based on the reflection that for a determination of the wheel rotational speed at a wheel, which is equipped with a wheel-hub coupler, it would be best to integrate a wheel rotational speed measuring function into the wheel-hub coupler, because the problem of overlapping mounting space would thus be omitted. In addition, the invention is based on the reflection that the wheel-hub coupler described hereinabove has a comparatively great potential for the power transfer because the hub of the motor vehicle, at which the wheel-hub coupler is arranged, generally is a precision part. This fact allows realizing a very small air slot between primary and secondary sides of the wheel-hub coupler so that, already at insignificant primary voltages, the transferable power exceeds by far the requirement of measuring circuits, as it is used for the rotating system. Thus, a reduction of the coupling capacity on account of losses in the pick-up of rotational speed values by the wheel-hub coupler would not impair the supply of the measuring circuit.

Still further, the invention is based on the reflection that a coupling of primary and secondary sides prevails already in the present wheel-hub coupler due to induced electromagnetic fields, and that the coupling should be dependent on the rotational speed for a simple realization of the rotational-speed measuring function.

Structuring the rotor and stator with sectors, which have a different permeability, will bring about that the magnetic coupling between the two sides of the wheel-hub coupler is tight at defined angles, i.e. a great coupling factor prevails, while a lower coupling factor prevails with other angles. When the two sides of the wheel-hub coupler are turned, a function of this angle of rotation is thereby integrated into the coupling between the two sides, and the overall function of rotation of the wheel rotational speed in a rotation is composed of a superposition of all sectors.

For a uniform output signal, consecutive sectors of rotor and/or stator preferably exhibit a permeability that alternates in its height.

As an alternative, sectors favorably have a different shape and/or a different material in the radial-axial plane. However, a magnitude of the magnetic coupling that differs in segments develops only when using ferromagnetic materials or other materials, which cause a change in the magnetic field or have an effect on the permeability.

Therefore, ferromagnetic material is suitably provided in a number of sectors.

For an integration of the windings of the casing of rotor and/or stator with the field windings with simultaneous rotational-speed-responsive field coupling, rotor and/or stator preferably are composed of a composite material, and the composition of the composite material is varying in sectors.

To achieve an appropriate permeability, the yoke of rotor winding and/or stator winding is expediently composed of sheet metal, or ferrite, or nano-cristalline or amorphous ferromagnetic alloys or plastic-bonded ferromagnetisms.

For a simple structure of the device, the casing of rotor and/or stator and the yoke of the rotor winding and/or stator winding, favorably, is grouped in one component.

Another possibility for a rotational-speed-responsive field coupling is realized when the rotor winding and/or the stator winding suitably include(s) a different number of windings in the sectors.

For a differing coupling in the sectors, the rotor winding and/or the stator winding, or a number of windings thereof, is advantageously designed sector wise in different axial or radial positions.

The advantages achieved by the invention particularly reside in the possibility of integrating a rotational speed measuring function in a wheel-hub coupler. This reduces additional effort for the function of rotational speed measurement compared to a separate rotational speed sensor to a major degree. In addition, it is possible to significantly minimize the pole pitch errors that occur in conventional rotational speed sensors because the rotation is measured in a way averaged over all sectors according to the invention.

When scrutinizing all functions which the described wheel-hub coupler can fulfill, such as signal transmission of most various tire condition variables, the energy supply of measurement systems in the wheel interior as well as the rotational speed measuring function, a low price per function can be achieved so that the possible application of a wheel-hub coupler as described in a motor vehicle is enhanced due to a low cost-benefit ratio.

Further preferred embodiments of the invention can be seen in the description of the Figures serving for a more detailed explanation of the invention.

DETAILED DESCRIPTION OF THE DRAWINGS

Figure 1:
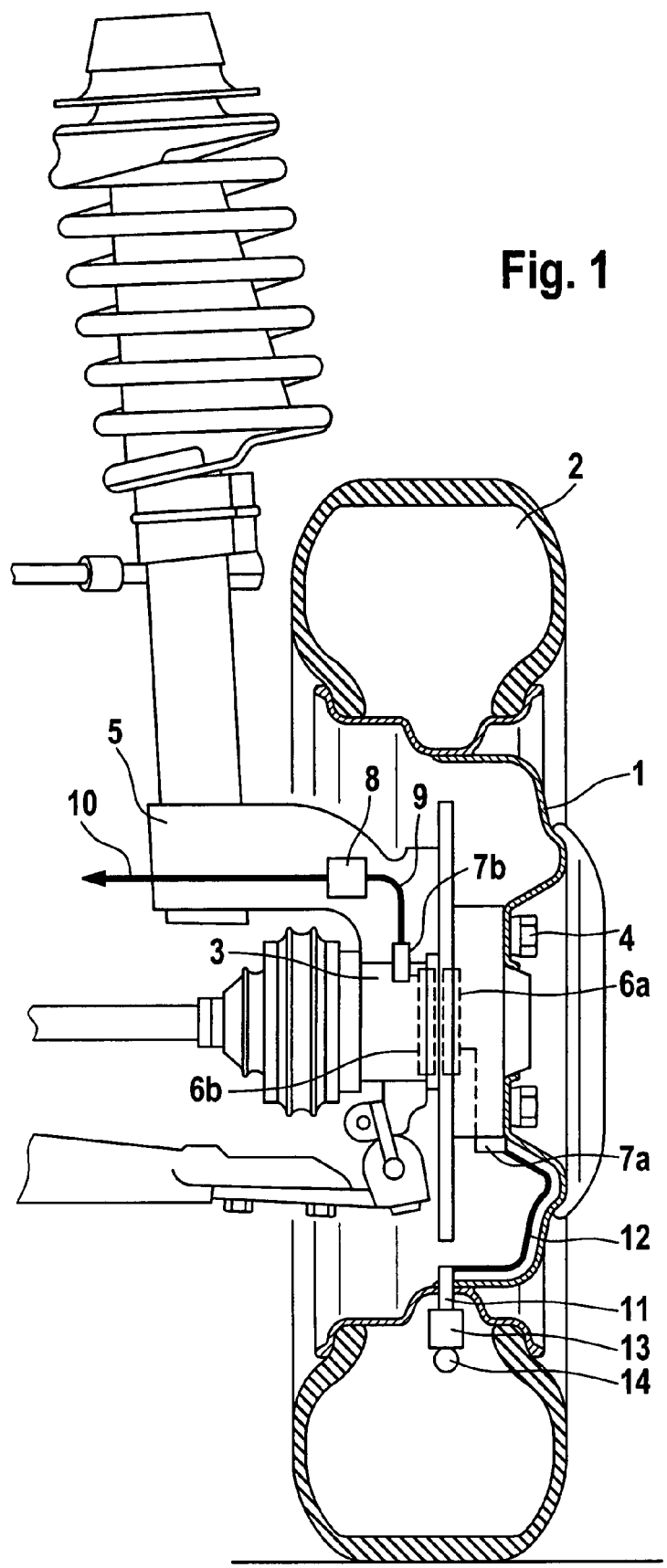
FIG. 1 is a system for transmitting tire condition variables.

FIG. 1 is a schematic view of a transmission system of the type of a wheel-hub coupler for tire condition variables, which comprises a wheel unit and a wheel-hub coupler detachably coupled to the wheel and connected to the body of a motor vehicle. The wheel is composed of rim 1 and tire 2 and is attached to wheel hub 3 by means of screws 4. Hub 3 comprises at least one bearing or a plurality of bearings and represents the mechanical interface between the rotating wheel and parts being stationary with respect to the wheel, e.g. the steering knuckles 5 of the vehicle body. Rotor 6a and a non-rotating stator 6b are integrated into wheel hub 3 for the transmission of the tire condition variables. The electrically effective electromechanical coupling elements are arranged opposite one another in the wheel-hub coupler, being isolated by only a narrow air slot, and energy coupling and/or signal coupling occurs by way of electromagnetic fields.

The electric access to the wheel-hub coupler is by plug connector 7a on the rotor side and by plug connector 7b on the stator side. In the proximity of the wheel hub 3, at the stationary steering knuckle 5, a cased electronic subassembly 8 is arranged, which houses electronic circuits for signal conditioning and/or for the supply of the wheel-hub coupler with alternating current and connects to it by way of plug cables 9. There is an electric connection 10 between subassembly 8 and the electronic control unit (ECU) of the motor vehicle (which is not shown). Another plug connector 11 is arranged in the wheel rim 1, and it is preferably configured as a plug receptacle in the present embodiment and especially as part of the wheel rim 1 forming a rim plug receptacle. Integrated in wheel rim 1 is plug cable 12 electrically connecting wheel-hub coupler and wheel rim plug receptacle with each other. At the inside surface of the wheel rim 1, subassembly 13 is arranged and used for the energy supply of a measuring device 14. To this end, the measuring device 14 comprises a number of sensors and is used to detect one or more specific tire condition variables in the interior of the tire 2.

Figure 2:
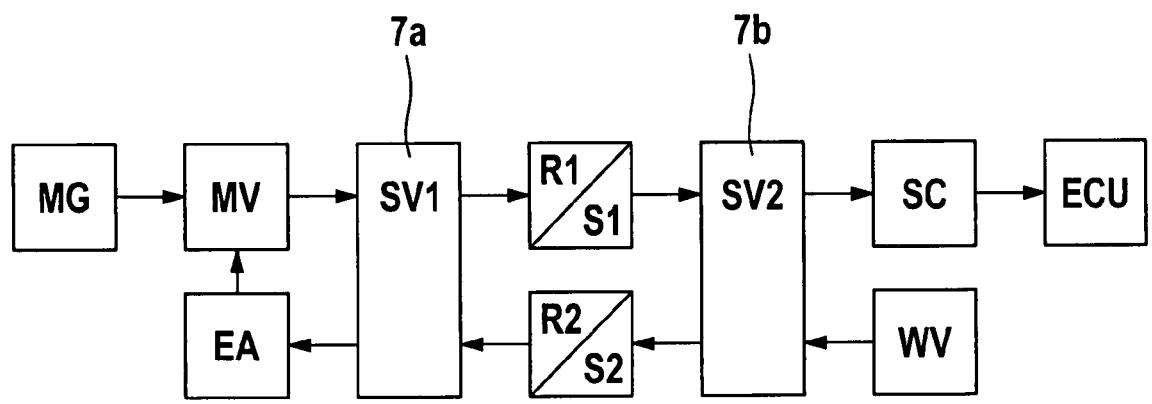
FIG. 2 is a diagrammatic view for the transmission system with two separate coupling paths.

In the embodiment, the transmission system, or rather the wheel-hub coupler, is provided with two separate coupling paths, as illustrated in FIG. 2. One coupling path R1/S1 serves to transmit signals from the measuring device 14 to the motor vehicle, while the other coupling path R2/S2 is used for the semi-active energy supply of the measuring device 14. For this purpose, subassembly 8 accommodates, in addition to the conditioning stage, an alternating current supply WV, which is connected to the wheel-hub coupler R/S (6a, 6b) by way of the plug coupling SV2 7b. The plug coupling SV1 leads to an energy-conditioning stage EA in subassembly 13, wherein, after rectifying and smoothing, direct-current voltage is furnished for operation of the measuring device MV 14. The two coupling paths are operated respectively with a suitable differing frequency for achieving a high efficiency.

Figure 3:
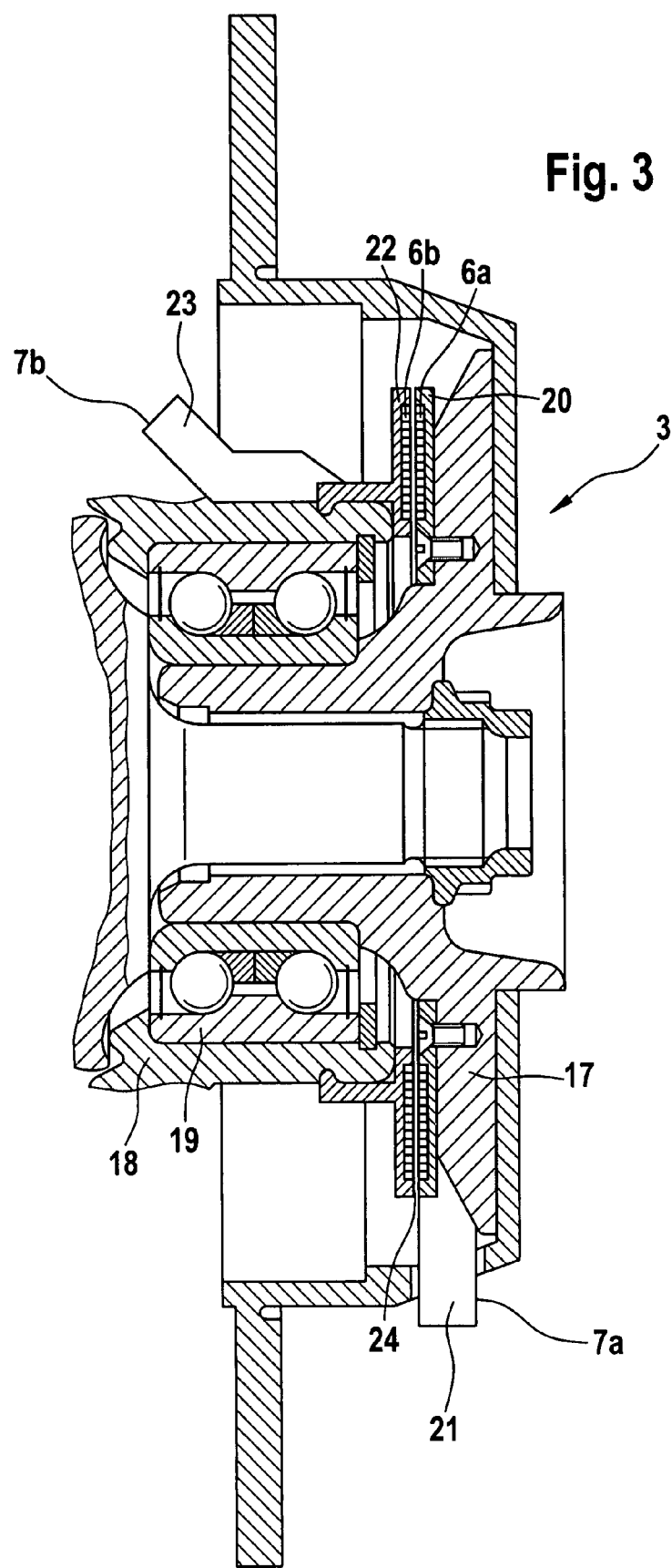
FIG. 3 is a view of a transmission system with flat coils.

For a clearer view on the transmission device, FIG. 3 schematically shows an enlarged wheel-hub coupler, and rotor 6a and stator 6b are provided with flat coils that extend in a circumferential direction for the production of the electromagnetic field. The rotor winding 20 and the stator winding 22 are illustrated in a simplified way, however, so that the separate coupling paths are not discernible from FIG. 3.

Figure 4:
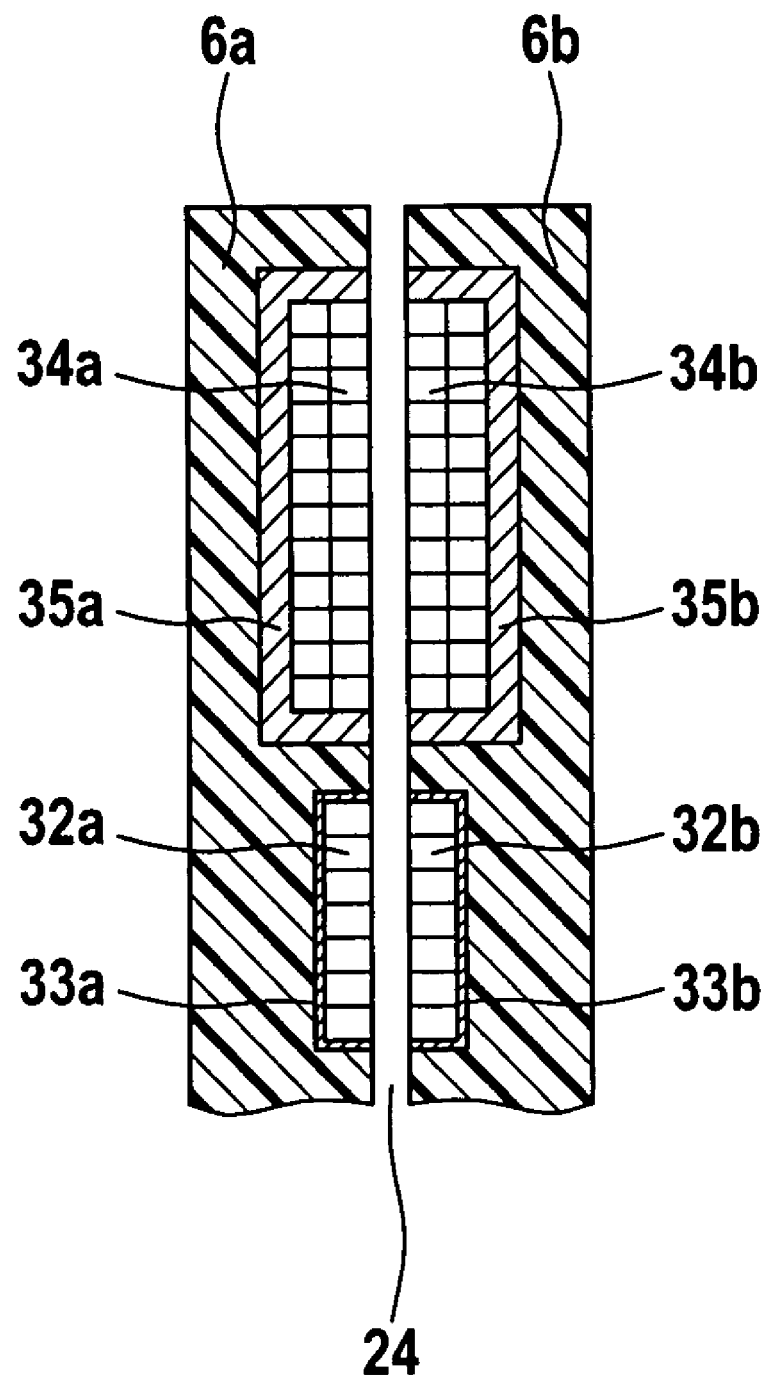
FIG. 4 is a view of a cross-section taken through the rotor 6a and stator 6b of the transmission system.

Therefore, FIG. 4 exhibits a radial cross-sectional view of the rotor 6a and the stator 6b. The coupling path for the signal transmission includes on the rotor and stator sides in each case one single-layer winding 32a and 32b, being embedded in shielding plate shells 33a and 33b. The two two-layer windings 34a and 34b, which are embedded in the ferrite shells 35a and 35b, serve to couple the energy transfer with alternating current from stator 6b to rotor 6a and are operated at a lower frequency than the windings 32a and 32b. The design of the windings with respect to the number of couplings, number of layers, type of embedding and the material of rotor 6a and stator 6b can be adapted and varied in conformity with the desired special application. There are no separate coupling paths in one preferred embodiment.

A special embodiment of rotor 6a and stator 6b is described in the following, which serves to sense rotational speed by way of the wheel-hub coupler, in addition to the functions of energy and signal transmission. This application relates to two opposite winding assemblies of rotor 6a and stator 6b, and it is not specified accurately which previously described coupling windings are implied, because this application is principally possible with all types of coupling windings.

Figure 5:
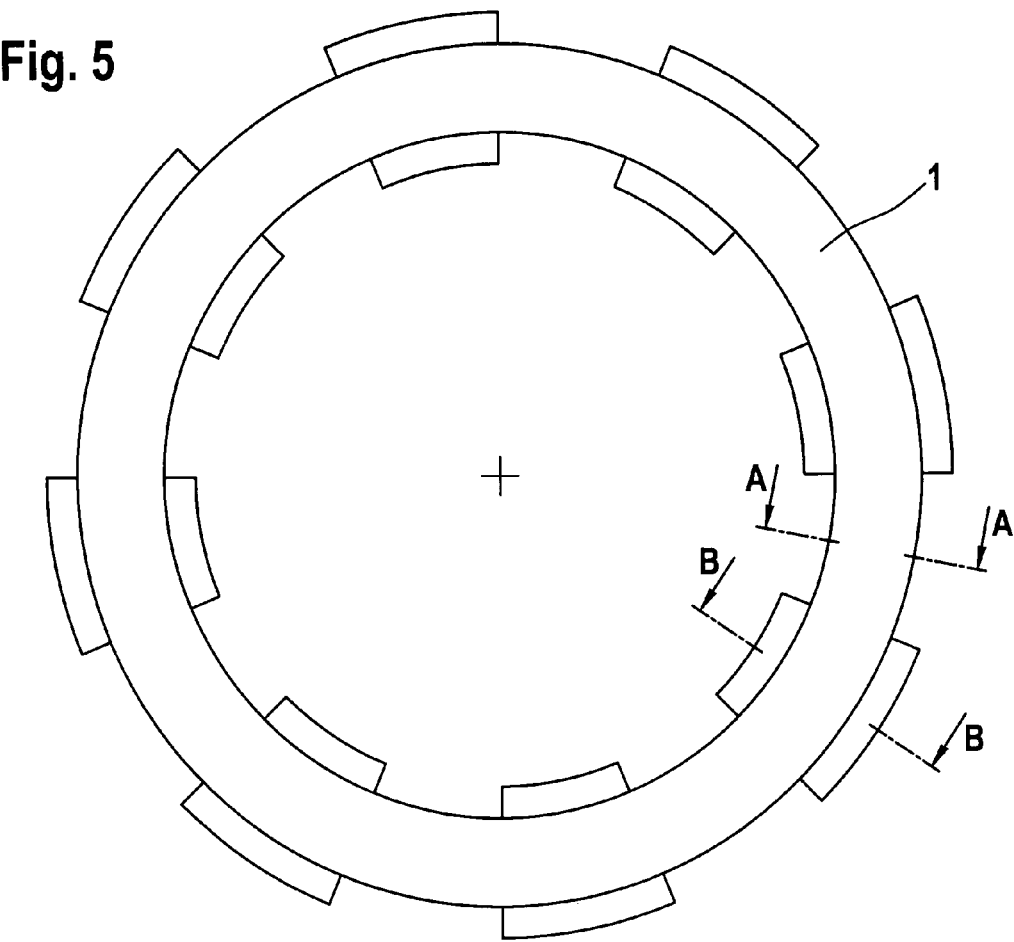
FIG. 5 is cross-sectional top view of rotor 6a and stator 6b.

For a coupling performance that depends on the rotational speed, rotor 6a and stator 6b in circumferential direction include segments of differently high magnetic coupling or exhibit a permeability that is different in sectors for this purpose. As FIG. 5 shows, the rotor 6a and the stator 6b are respectively divided into 16 sectors of 22.5° each, and sectors with section A-A and sectors with section B-B are arranged alternatingly. In the top view, only the yoke 51 of the secondary side winding or the rotor 6a is visible. This yoke encloses the rotor winding 20. Disposed below the rotor 6a is the stator 6b with the stator winding 22, which is embedded in the yoke 51 of the primary side.

Different designs of rotor 6a and stator 6b are possible, being shown in FIGS. 6 to 11, for the alternating magnitude of the permeability or the magnetic coupling. Section A-A shows in each case a segment with low magnetic coupling, and section B-B shows a segment with high magnetic coupling.

Figure 6:
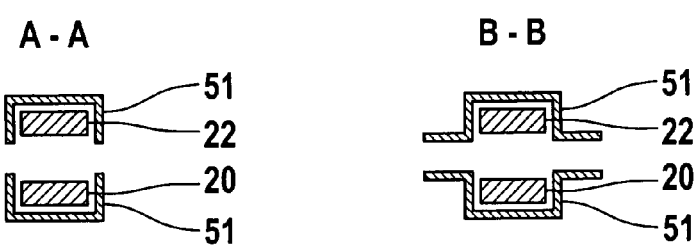
FIGS. 6 to 12 are the cross-sectional views A-A and B-B of FIG. 5 with different designs of rotor 6a and stator 6b.

In FIG. 6, the yoke 51 of rotor 6a and stator 6b is furnished with a lateral flange for a high magnetic coupling, so that a low magnetic resistance develops during operation due to the increased air slot cross-section in section B-B.

Figure 7:
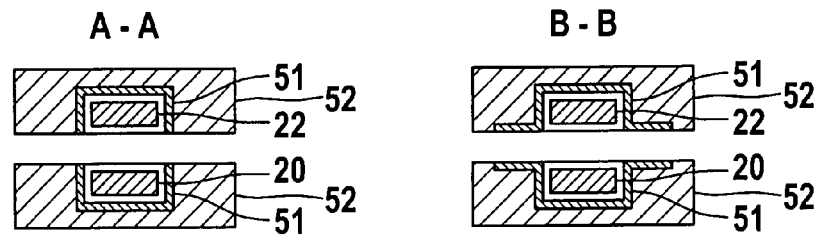
Figure 8:
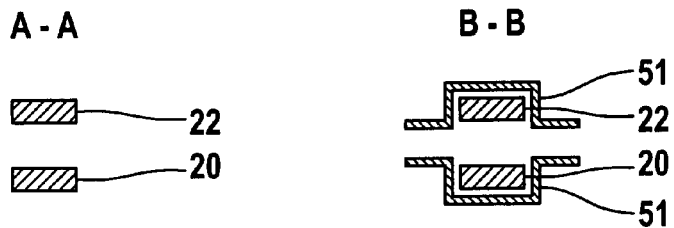

The same principle is realized in FIG. 7, the yoke 51 of rotor 6a and stator 6b being incorporated into a casing 52 for better stability and attachment at wheel hub 3. In FIG. 8, an alternating magnetic coupling magnitude is realized by sectors in cross-section A-A, which do not include a yoke or yoke surface, and therefore the magnetic coupling is lower in this case.

Figure 9:
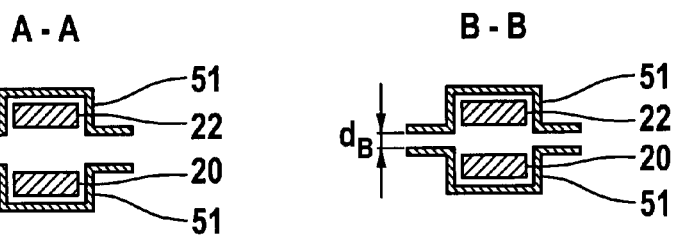

In FIG. 9, a differently sized air slot 24 is chosen for a differing coupling of the segments. The slot is chosen to be larger in an axial direction for a lower coupling than the slot for segments with higher coupling.

Figure 10:
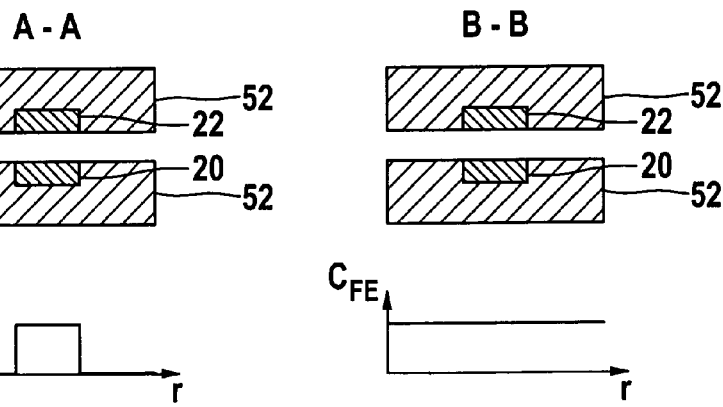

A magnetic coupling which is different in segments is realized in FIG. 10 because a composite material with different ferrite concentrations is employed for the casing 52, wherefrom different permeability results. The rotor winding 20 and the stator winding 22 are integrated directly into the casing 52 so that a yoke as a separate component is omitted.

Figure 11:
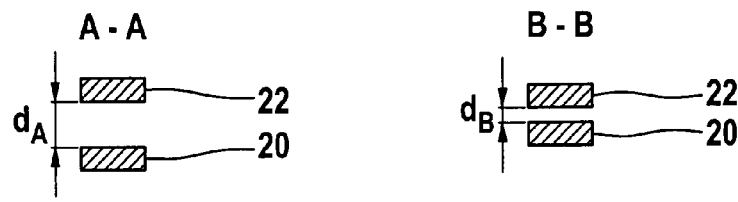
Figure 12:
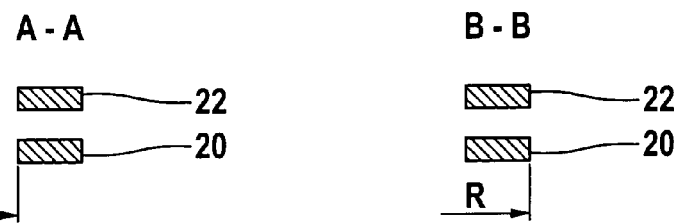

In FIG. 11, the air slot 24 is likewise chosen to have a different size for the segmentation, and a ferromagnetic yoke is not used in this design. A similar arrangement is realized in FIG. 12, wherein in contrast to FIG. 11, the radial distance instead of the radial distance of rotor winding 20 and stator winding 22 is configured to a have a different size.

Figure 13:
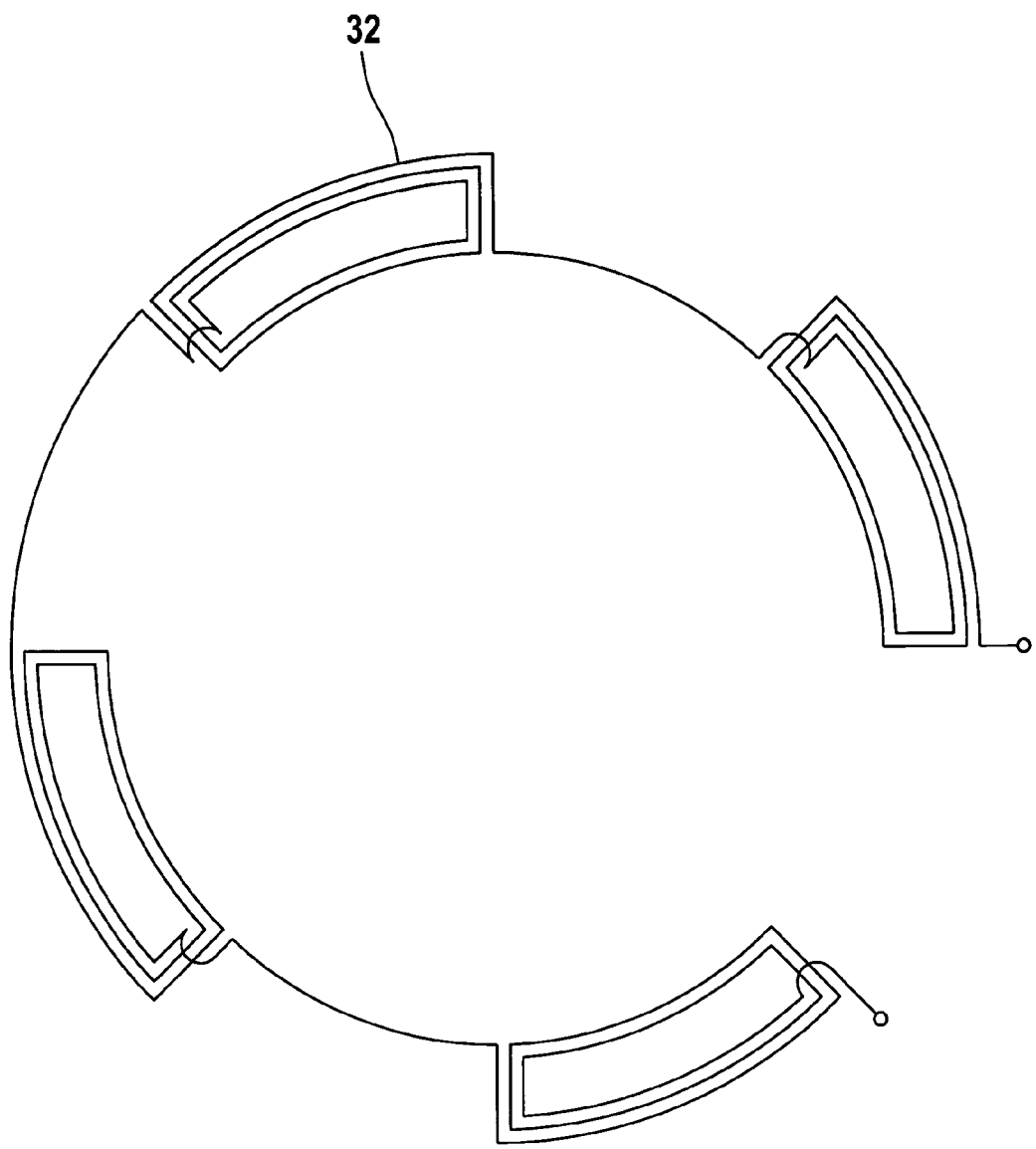
FIG. 13 is cross-sectional top view of a winding of rotor 6a and stator 6b in an axial direction.

FIG. 13 illustrates a sectional top view of a winding 32 of rotor 6a and stator 6b in an axial direction. In this arrangement, a different segment wise magnetic coupling is realized in that the windings concentrate alternatingly on the sectors.

Figure 14:
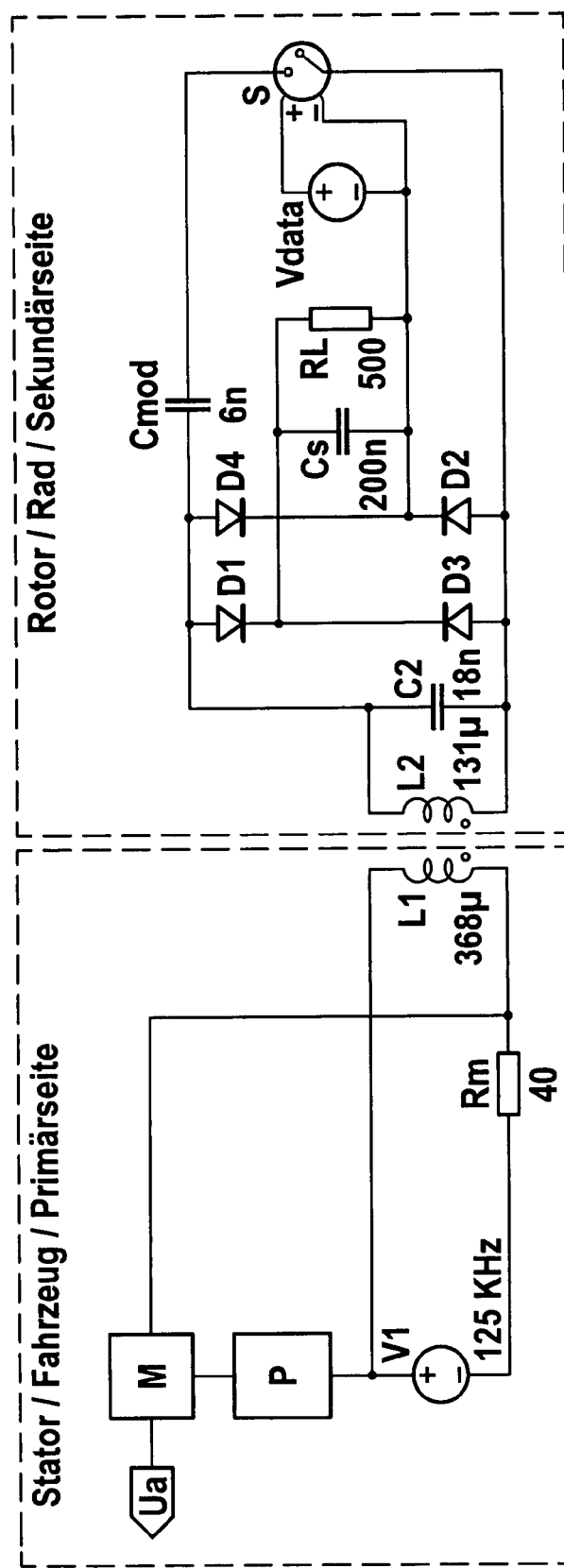
FIG. 14 shows an electronic evaluating circuit.

An appropriate measuring circuit for determining the rotational speed of the arrangement described is illustrated in FIG. 14. The voltage source V1 produces a current in the primary coil L1 at a frequency of 125 kilohertz. The pulse source has a 5 volt amplitude. L1 is coupled to C2 by way of the wheel-hub coupler (L1, L2). The voltage induced in the secondary circuit (L2, C2) is rectified by a bridge rectifier (D1, D2, D3, D4) and filtered with Cs. The effective circuit composed of sensor and signal processing unit is modeled as a consumer by the load resistor RL. The output of this circuit, at which the measured data prevails, is modeled by the source Vdata. Said opens and closes the switch S, which is configured as a switching transistor. Thus, capacitor Cmod is added to the resonance circuit L2, C2 corresponding to Vdata. The resulting change in the resonance frequency cause a change of the voltage at the measuring resistor Rm. This voltage is demodulated in the multiplier M in order to obtain an output signal without the 125 kilohertz carrier from V1. To this end, the voltage is sent to the multiplier M also by way of the phase shift network P, which is an RC element in the embodiment.

Figure 15:
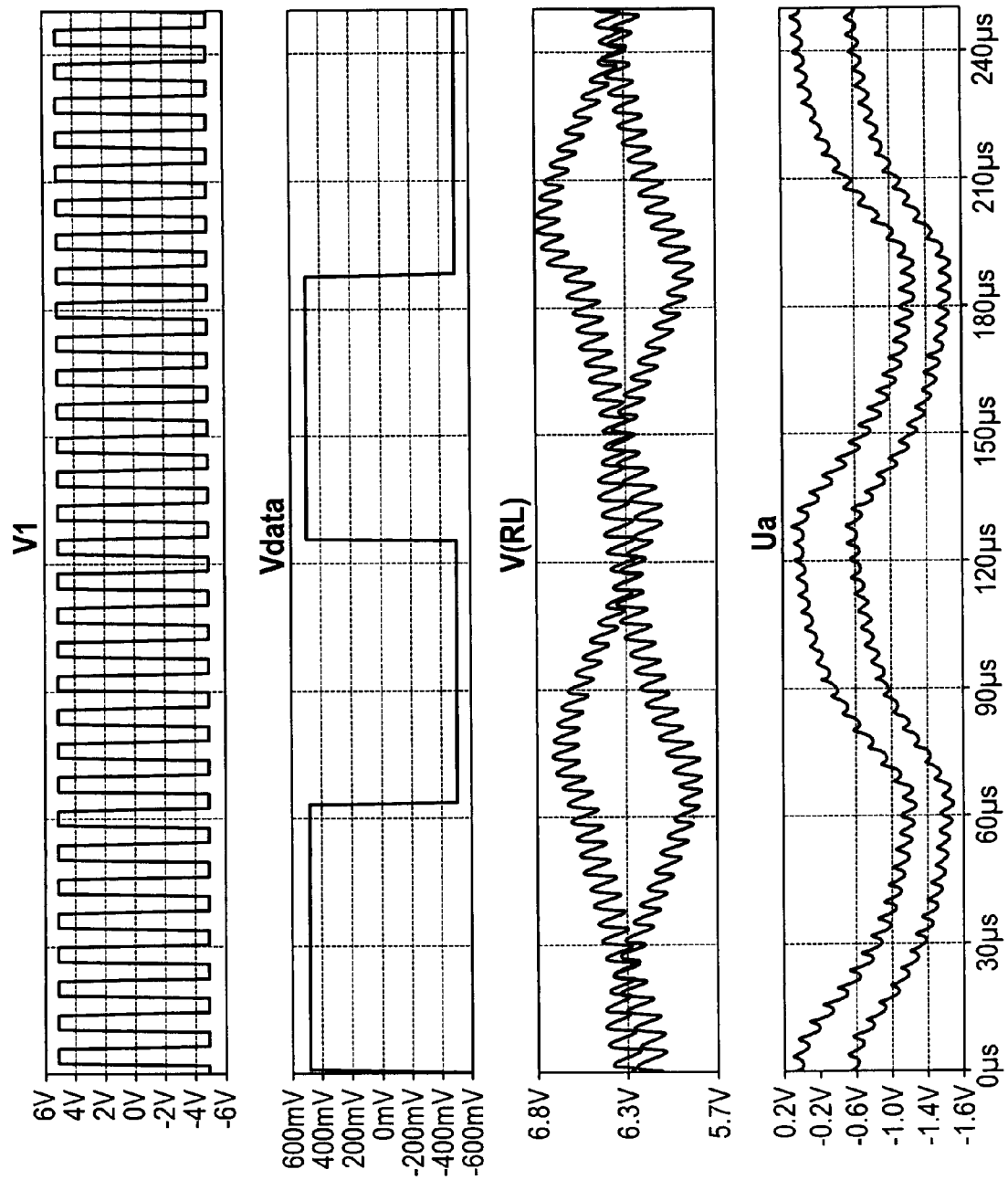
FIG. 15 shows the voltage variations of the evaluating circuit in FIG. 14.

FIG. 15 illustrates the voltages that result. V1 is a square-wave voltage with +/−5 volt at 125 kilohertz. A square-wave voltage of 8 kilohertz simulates Vdata. Both signals can be found in the voltage V (RL) at the load resistor RL, yet the changes in voltage are comparatively insignificant. The voltage at the output of the circuit on the vehicle side Ua noticeably follows the data source Vdata so that the measuring data can be recuperated from Ua. The two curves Ua represent the variation with a maximum coupling factor k1 and a minimum coupling factor k2 in two different positions of the turn of primary and secondary side of the wheel-hub coupler. The rotational speed can be determined by measuring the average value of Ua.

LIST OF REFERENCE NUMERALS 1 wheel rim
2 tire
3 wheel hub
4 screw
5 steering knuckle
6a rotor
6b stator
7 plug connector
8 subassembly
9 plug cable
10 electrical connection
11 plug connector
12 plug cable
13 subassembly
14 measuring device
17 pivoted part of the wheel hub
18 stationary part of the wheel hub
19 ball bearing
20 rotor winding
21 plug receptacle
22 stator winding
23 plug receptacle
24 air slot
32 winding
33 shielding metal plate
34 winding
35 ferrite shells
51 yoke
52 casing

The invention claimed is:

1. A transmission device for a motor vehicle for transmitting signals about tire condition variables from a wheel to an electronic unit arranged in the vehicle body, wherein the tire condition variables can be detected especially by one or a plurality of sensor subassemblies (14) which are arranged in a wheel rotatably mounted at the body above the wheel hub (3), the device comprising:
   a coupling device is integrated into a wheel hub, which is composed of a rotor (6a) and a non-rotating stator (6b) to generate a field coupling, and whose one or more field coupling elements (20, 22, 34a, 34b, 39a, 39b) are opposite each other, separated by a narrow air slot (24), and a signal coupling takes place by at least one of electric fields, magnetic fields, and electromagnetic fields, and least one of the rotor (6a) and the stator (6b) is subdivided in a circumferential direction into two or more sectors, with the sectors including a differing magnetic coupling for a rotational-speed-responsive field coupling of rotor (6a) and stator (6b); and
   wherein the two or more sectors are alternately arranged in the circumferential direction such that the field coupling has an alternating output resulting from the differing magnetic coupling.

2. The transmission device of claim 1, wherein the two or more sectors that are consecutive to each other in a circumferential direction of the rotor (6a) or stator (6b) have a permeability alternating in magnitude.

3. The transmission device of claim 1, wherein the two or more sectors have a different shape or a different material in one of the radial and axial direction.

4. The transmission device of claim 1, wherein ferromagnetic material is provided in a number of sectors.

5. The transmission device of claim 1, wherein at least one of the rotor (6a) and the stator (6b) is composed of a composite material, and the composition of the composite material differs sector wise.

6. The transmission device of claim 1, wherein electronic access to the device on the rotor side and the stator side is realized by plug connectors.

7. The transmission device of claim 6, wherein a cable-shaped electric signal plug connector (7a, 11, 12) from the wheel hub to the detection device for measured values is provided.

8. The transmission device of claim 1, wherein the wheel hub (3) comprises an integrated coupling device (6a, 6b).

9. The transmission device of claim 1, wherein a cable plug connector (7b, 9) is provided, which is configured to connect to a cased electronic component (8) or a cable connection (10) to an electronic control unit (ECU).

10. The transmission device of claim 1, wherein the coupling device comprises flat coils composed of a rotor with rotor winding (20) and a stator with stator winding (22).

11. The transmission device of claim 1, wherein that the coupling device is composed of embracing cylindrical coils, comprising a rotor with integrated rotor winding and a stator with integrated stator winding.

12. The transmission device of claim 1, wherein at least one of the rotor winding (20) and the stator winding (22) has a different number of windings in the sectors.

13. The transmission device of claim 1, wherein at least one of the rotor winding (20) and the stator winding (22) is designed sector wise in different axial or radial position.

14. The transmission device of claim 1, wherein at least one of the stator (6a) and the rotor (6b) of the device is mechanically connected to parts of one or a plurality of ball bearings (19) mounting into the wheel hub.

15. The transmission device of claim 1, wherein base members of rotor (6a) and stator (6b) are composed of a magnetically and electrically non-conductive material.

16. The transmission device of claim 1, wherein the coupling device is designed with two or more single-layer windings, which are embedded in ferrite shells.

17. The transmission device of claim 1, wherein the coupling device is designed with multi-layer windings, which are embedded directly into the associated base members.

18. The transmission device of claim 1, wherein the coupling device is designed with two-layer windings, which are embedded into shielding metal plates.

19. The transmission device of claim 1, wherein the coupling device is designed with two or more windings (32a, 32b), embedded in shielding metal plates (33a, 33b), and additional two or more windings (34a, 34b), embedded in ferrite shells (35a, 35b).

20. The transmission device of claim 1, wherein a dynamo to produce a supply voltage for operation of the electronic circuit in the sensor subassembly is integrated into the coupling device.

21. The transmission device of claim 20, wherein the dynamo is made up of a ring of permanent-magnetic segments on the stator side and coil arrangements (38a) with iron cores (38b) on the rotor side.

22. A vehicle wheel equipped with sensors, the vehicle wheel comprising:
- a wheel rim (1);
- a tire (2);
- one or more sensor subassemblies (13) rotating with the wheel,
- a coupling device is integrated into a wheel hub, which is composed of a rotor (6a) and a non-rotating stator (6b) to generate a field coupling, and whose one or more field coupling elements (20, 22, 34a, 34b, 39a, 39b) are opposite each other, separated by a narrow air slot (24), and a signal coupling takes place by at least one of electric fields, magnetic fields, and electromagnetic fields, and least one of the rotor (6a) and the stator (6b) is subdivided in a circumferential direction into two or more sectors, with the sectors including a differing magnetic coupling for a rotational-speed-responsive field coupling of rotor (6a) and stator (6b); and
- wherein the two or more sectors are alternately arranged in the circumferential direction such that the field coupling has an alternating output resulting from the differing magnetic coupling.

23. The vehicle wheel of claim 22, wherein the sensor subassembly comprises a sensor element (14) and a signal transmitting subassembly (13), with the sensor element and the signal transmitting subassembly being integrated in a common component.

24. The vehicle wheel of claim 22, wherein the sensor subassembly comprises one or more sensors with an electronic circuit for conditioning the sensor signal(s).

25. The vehicle wheel of claim 22, wherein a sensor subassembly is integrated into the tire.

26. The vehicle wheel of claim 22, wherein an energy transmission subassembly is provided for the energy supply to a sensor subassembly.

27. The vehicle wheel of claim 22, wherein the electric connection to the transmission device comprises a plug connector.

28. The vehicle wheel of claim 22, wherein the sensor subassembly is supplied with direct current energy by a battery integrated into the sensor subassembly.

29. The vehicle wheel of claim 22, wherein an energy supply and signal transmission subassembly cooperates with a sensorial measuring device that is anchored in an area of a tire cover by way of field coupling for the signal transmission of the measuring device, and the energy transfer takes place by a transponder.

30. The vehicle wheel of claim 29, wherein the field coupling takes place electrically, magnetically, or electromagnetically.

31. The vehicle wheel of claim 29, wherein the field coupling takes place optically, acoustically, or through thermal radiation.

32. The vehicle wheel of claim 22, wherein a sensorial measuring device (15) is supplied with direct current energy by a generator integrated into the measuring device.

33. The vehicle wheel of claim 22, wherein a cable is integrated into the wheel rim, which includes a plug as output to the coupling device and a wheel rim plug receptacle on the tire side, which allows an electromechanical plug connection to the tire interior and into which the sensor subassembly can be plugged and anchored in an electromechanically stationary fashion.

34. The vehicle wheel of claim 33, wherein the wheel rim plug receptacle is integrated stationarily into the wheel rim body in such a fashion that it projects into the tire space in an airtight manner.

35. The vehicle wheel of claim 22, wherein the sensor subassembly has a device for generating electric tire condition signals connected via the coupling device to a cased electronic subassembly or an electronic control unit (ECU).

36. The vehicle wheel of claim 35, wherein the tire condition signals includes a variable for at least one of a cover inflation pressure, air temperature, tire temperature, a wheel contact force, a brake torque, and a wheel rotational speed.

37. The vehicle wheel of claim 35, wherein the tire condition signal includes variables that cover parameters of a type of tire or its operating condition.

38. A system for transmitting tire condition variables, the system comprising:
- a vehicle wheel comprising:
  - a wheel rim (1);
  - a tire (2);
  - one or more sensor subassemblies (13) rotating with the wheel;
- a transmission device for a motor vehicle for transmitting signals about tire condition variables from a wheel to an electronic unit arranged in the vehicle body, wherein the tire condition variables can be detected especially by one or a plurality of sensor subassemblies (14) which are arranged in a wheel rotatably mounted at the body above the wheel hub (3), the device comprising:
- a coupling device is integrated into the vehicle wheel, which is composed of a rotor (6a) and a non-rotating stator (6b) to generate a field coupling, and whose one or more field coupling elements (20, 22, 34a, 34b, 39a, 39b) are opposite each other, separated by a narrow air slot (24), and a signal coupling takes place by at least one of electric fields, magnetic fields, and electromagnetic fields, and least one of the rotor (6a) and the stator (6b) is subdivided in a circumferential direction into two or more sectors, with the sectors including a differing magnetic coupling for a rotational-speed-responsive field coupling of rotor (6a) and stator (6b); and
- wherein the two or more sectors are alternately arranged in the circumferential direction such that the field coupling has an alternating output resulting from the differing magnetic coupling.

39. The system of claim 38, wherein the sensor subassembly is supplied with alternating current energy from a cased electronic subassembly or an electronic control unit (ECU) through the coupling device.

40. The system of claim 38, wherein the sensor subassembly is supplied with alternating current energy, which is produced by the transmission device from rotational energy of the wheel.

41. The system of claim 38, wherein the system comprises a cable-shaped electric signal connection to a cased electric brake control unit (ECU).

* * * * *